(12) United States Patent
Goehly

(10) Patent No.: US 6,254,049 B1
(45) Date of Patent: Jul. 3, 2001

(54) IRRIGATION LINE AND PLANT SUPPORT

(76) Inventor: Ludwig W. Goehly, R.R. #1, S-33, C-12, Osoyoos, British Columbia (CA), V0H 1V0

( * ) Notice: Subject to any disclaimer, the term of this patent is extended or adjusted under 35 U.S.C. 154(b) by 0 days.

(21) Appl. No.: 09/318,639

(22) Filed: May 26, 1999

Related U.S. Application Data

(60) Provisional application No. 60/096,842, filed on Aug. 18, 1998.

(51) Int. Cl.[7] ........................................ A47H 1/16
(52) U.S. Cl. ............................... 248/302; 47/14
(58) Field of Search ..................... 248/302, 249, 248/175; 256/47; 47/14; 91/18

(56) References Cited

U.S. PATENT DOCUMENTS

| | | | |
|---|---|---|---|
| 3,749,346 | * | 7/1973 | Cherniak ........................ 248/302 |
| 4,893,788 | | 1/1990 | Chave ............................. 256/47 |
| 5,004,211 | * | 4/1991 | Rayner ............................ 256/47 |
| 6,000,172 | | 12/1999 | Ballarino . | |

FOREIGN PATENT DOCUMENTS

| | | | |
|---|---|---|---|
| 271481 | 6/1927 | (CA) | .............................. 47/14 |
| 279684 | 4/1928 | (CA) | .............................. 47/14 |
| 299197 | 4/1930 | (CA) | .............................. 91/18 |
| 781675 | 4/1968 | (CA) | .............................. 47/14 |
| 967750 | 5/1975 | (CA) | .............................. 47/14 |
| 1029266 | 4/1978 | (CA) | ............................. 131/89 |
| 1138648 | 4/1983 | (CA) | .............................. 47/14 |

* cited by examiner

Primary Examiner—Ramon O. Ramirez
(74) Attorney, Agent, or Firm—Anthony C. Edwards

(57) ABSTRACT

A support bracket for mounting on a support wire includes a resilient U-shaped member having mutually orthogonal partial loops formed at the distal ends thereof. The legs of the U-shaped member lie in planes which diverge by an acute angle and which intersect through the base of said U-shaped member.

8 Claims, 4 Drawing Sheets

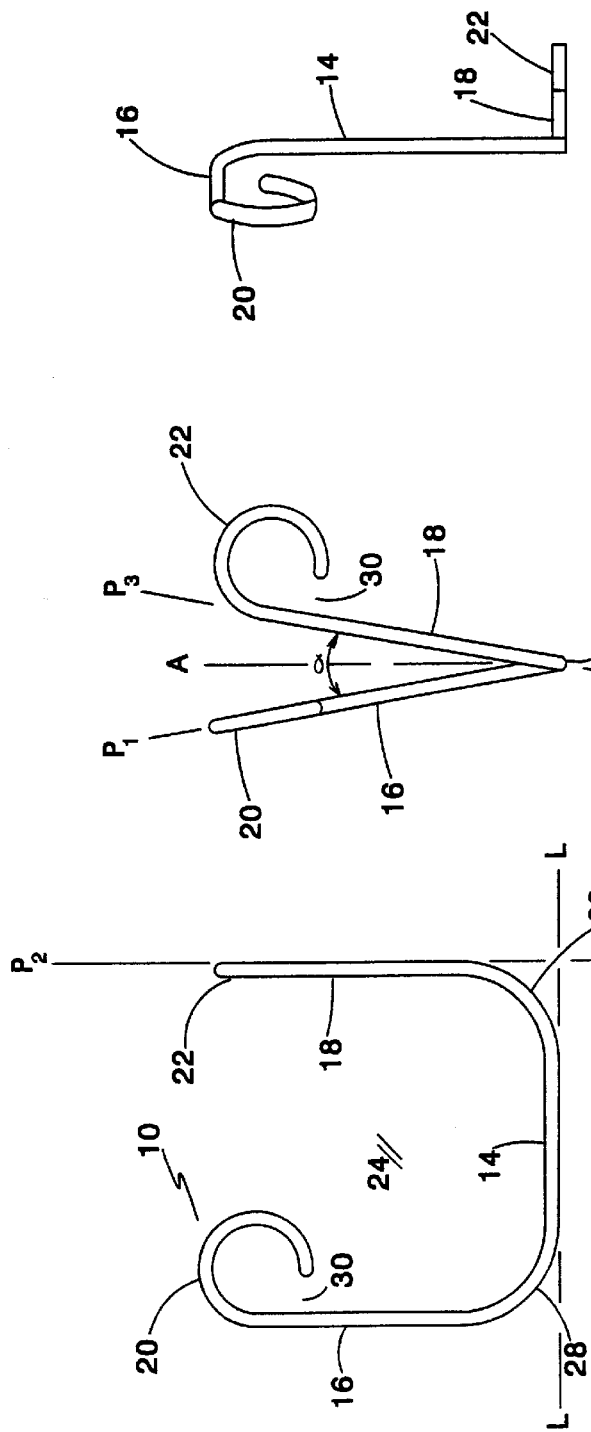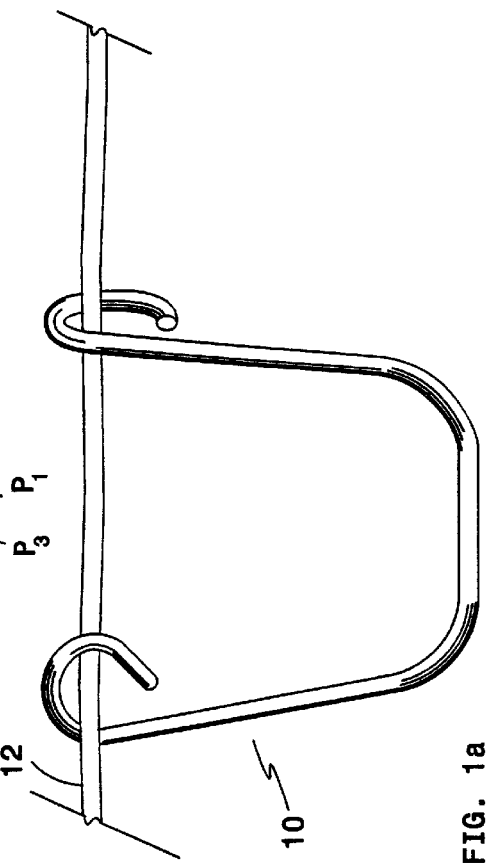

IRRIGATION LINE AND PLANT SUPPORT

CROSS REFERENCE TO RELATED APPLICATION

This application claims priority from U.S. Provisional Patent Application No. 60/096,842 filed Aug. 18, 1998 and Canadian Patent Application No. 2,258,727 filed Jan. 14, 1999, titled Irrigation Line and Plant Support.

FIELD OF THE INVENTION

This invention relates to the field of devices used in orchards or the like for releasably supporting a plant sapling or like immature growth against a rigidly mounted supporting wire and in particular to resilient clips or clamps or brackets adapted for supporting such plants against rigid support wires where such devices may be employed to also support irrigation lines generally parallel to the support wire.

BACKGROUND OF THE INVENTION

Saplings or like immature plants in an orchard typically have to be supported and irrigated. It is known in the prior art to use a single generally horizontal line of heavy gauge high-density wire rigidly supported between spaced apart generally vertical poles. Plastic hooks or clamps are releasably suspended from the horizontal line of heavy gauge high-density wire to support sapling trunks generally vertically. It is known in the prior art to use plastic clips for releasably mounting saplings to the horizontal wire line. However, such plastic clips do not display the versatility of the supporting device of the present invention and typically due to harsh weather environments have a relatively high failure rate and must be seasonally replaced.

Canadian Patent No. 967,750 which issued May 20, 1975 to Zelinka for a Clip for Plant and Vine Line Suspension is one example of an attempt in the prior art to support a growing immature plant from a horizontal support line. Zelinka teaches using a generally rectangular sheet body having a plurality of transversely disposed line engaging slots formed in the body. The spaced apart slots cooperate to grip a vertical supporting line frictionally when the line is woven through the slots in the sheet body. It is neither taught nor suggested to provide a resilient supporting bracket which may be releasably mounted directly on to the horizontal supporting line.

In the prior art, applicant is however aware of a supporting bracket which is mounted onto a horizontal wire so as to support the wire adjacent a generally vertical member. In particular, applicant is aware of Canadian Patent No. 299,197 which issued Apr. 8, 1930 to Davidson for a Wire Securing Clip. Davidson discloses a U-shaped clip provided with loops for securing fence wires to fence posts. The loops are provided at the distal ends of the generally U-shaped clips and, once the clip is positioned around a fence post so as to extend the distal ends of the clip over the fence wire, the loops may be bent so as to wrap around the wire thereby securing the wire against the fence post. What is neither taught nor suggested is to provide a generally U-shaped clip or bracket having the spacial orientation of the present device whereby the ends of the device may be releasably secured to a supporting wire by resiliently deforming the clip rather than by bending of the ends of the clip so as to wrap the ends of the clip around the wire.

SUMMARY OF THE INVENTION

The present invention is a support bracket for mounting on a support wire. It comprises a resilient U-shaped member having mutually orthogonal partial loops formed at the distal ends thereof wherein the legs of the U-shaped member lie in planes which diverge by an acute angle and which intersect through the base of the U-shaped member.

In particular, the support bracket of the present invention for mounting on a support wire includes a generally U-shaped resilient member. The U-shaped member has a base segment, and a first leg extending from a first end of said base segment to a distal end of said first leg. The U-shaped member also has a second leg extending from a second end of said base segment, wherein the second end of the base segment is opposite said first end of said base segment. A first loop is formed at said distal end of said first leg. A second loop is formed at said distal end of said second leg.

The said first loop, said first leg, and at least a portion of said base segment lie generally in a first plane. The said second loop and said second leg lie generally in a second plane. The said second leg and at least a portion of said base segment lie generally in a third plane. The said first and third planes are generally orthogonal to said second plane. The said first and third planes intersect along a line of intersection generally co-extensive with at least a portion of said base segment. The said first and third planes are disposed at an acute angle relative to each other so as to define an acute angle of divergence therebetween.

The said second loop is formed so as to lie outside of an area between said first and third planes swept out by said acute angle of divergence. The said first loop has a first gap therethrough in proximity to said first leg for passing a support wire into said first loop. The said second loop has a second gap therethrough in proximity to said second leg for passing said support wire into said second loop. The first loop may thus be hooked over said support wire, so that said support wire is in said first loop. This leaves the U-shaped member depending from said support wire. The U-shaped member may then be rotated in a first direction of rotation into a support wire first engaging position wherein said support wire is in contact with opposite interior sides of said first loop. The U-shaped member may then be further rotated in said first direction of rotation from said support wire first engaging position into a support wire second engaging position by resilient bending of said U-shaped member to hook said second loop over said support wire. The support wire is thus resiliently urged against an interior side of said second loop.

Advantageously, said first and second legs are generally parallel and generally linear, and said base segment is generally linear. The acute angle of diversion may be approximately 20 degrees. The first and second loops may be generally circular. The U-shaped member may be made of heavy gauge wire.

Further advantageously, said first loop is sized so that, in said support wire first engaging position, said U-shaped member must be resiliently bent so as to further rotate said U-shaped member in said first direction of rotation into said support wire second engaging position. In addition to the first loop being sized sufficiently small, advantageously the acute angle of diversion is also sufficiently small so that, in said support wire first engaging position, said U-shaped member must be resiliently bent so as to further rotate said U-shaped member in said first direction of rotation into said support wire second engaging position.

BRIEF DESCRIPTION OF THE DRAWINGS

FIG. 1a is an enlarged view of the supporting bracket of FIG. 1.

FIG. 3 is, in front elevation view, the supporting bracket of the present invention.

FIG. 4 is a right side elevation view of the supporting bracket of FIG. 3.

FIG. 5 is a top plan view of the supporting bracket of FIG. 3.

DETAILED DESCRIPTION OF THE PREFERRED EMBODIMENT

Figure 1:
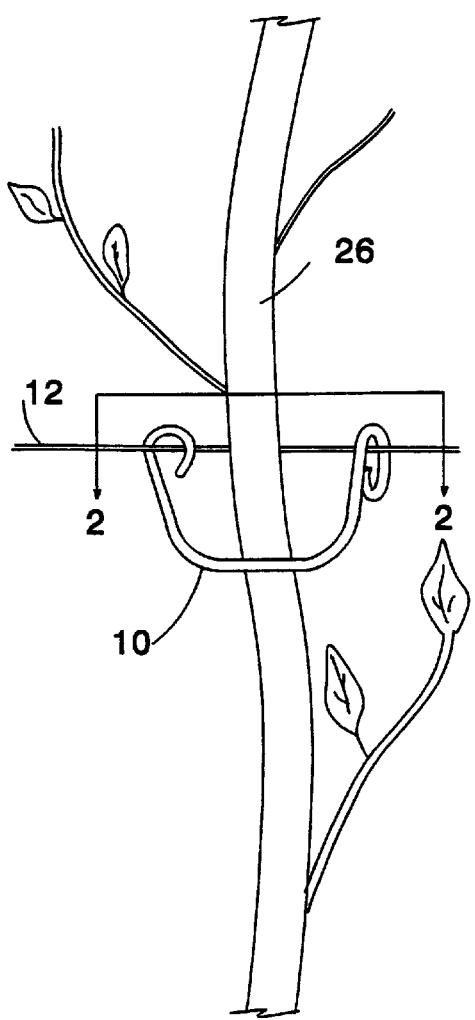
FIG. 1 is, in front elevation view, a plant supported by the supporting bracket of the present invention.
Figure 2:
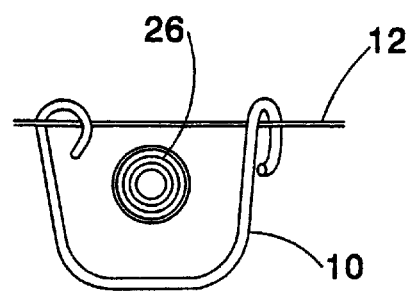
FIG. 2 is a section view along line 2—2 in FIG. 1.
Figure 1C:
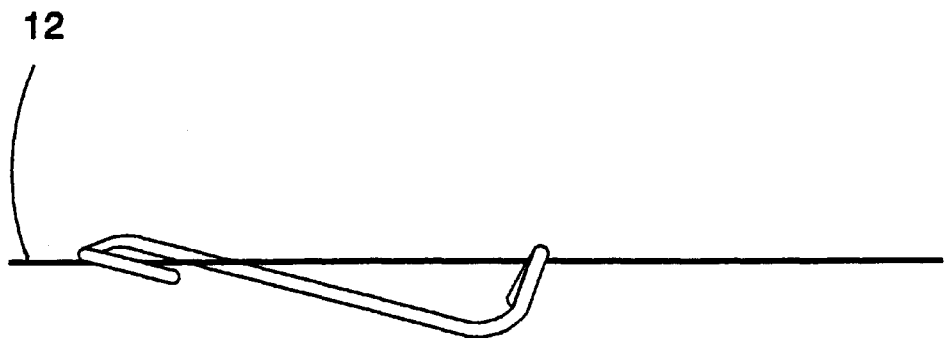
FIG. 1c is, in plan view, the supporting bracket of FIG. 1b installed onto the wire.
Figure 1B:
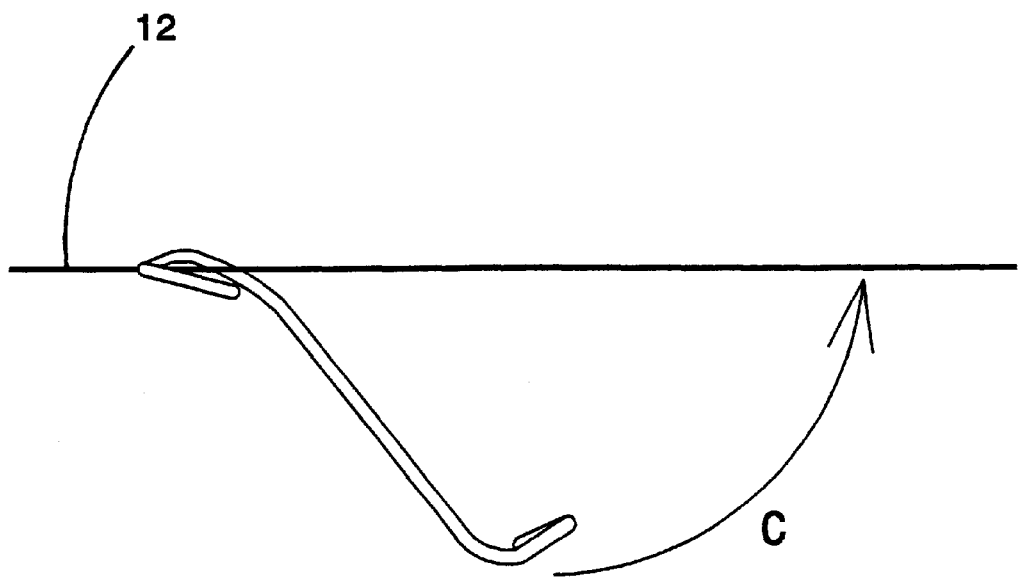
FIG. 1b is, in plan view, the supporting bracket of FIG. 1 being installed onto a wire.

As may be seen in FIGS. 1, 1a and 2, the supporting bracket 10 of the present invention may be releasably clipped onto a generally horizontal support wire 12. Supporting bracket 10 is generally U-shaped and has a base segment 14 and first and second legs 16 and 18, respectively, extending generally perpendicularly from base segment 14. The distal ends of first and second legs 16 and 18 terminate in first and second formed loops 20 and 22 respectively. Base segment 14, first leg 16 and second leg 18 define therebetween a tree supporting space 24. Thus, tree 26 may be supported against support wire 12 by supporting bracket 10 when supporting bracket 10 is releasably clipped onto support wire 12, as better described below so as to retain tree 26 within tree supporting space 24.

First formed loop 20 is spatially oriented generally at 90° to the orientation of second formed loop 22. That is, a first plane $P_1$ containing first formed loop 20, first leg 16 and base segment 14 orthogonally intersects a second plane $P_2$ incorporating second formed loop 22 and second leg 18. In FIGS. 3–5, the first plane may be thought of as being parallel to a sheet of paper containing FIG. 3, and the second plane may be thought of as parallel to a sheet of paper containing FIG. 4.

As better understood from FIGS. 4 and 5, the spacial orientation of first and second legs 16 and 18 also define a generally V-shaped divergence, advantageously approximately cumulatively 20°, illustrated by reference angle α as 10° on either side of a center vertical axis A. Angle α extends between first plane $P_1$, and a third plane $P_3$ containing base segment 14 and second leg 18. In FIG. 4, the first and third planes may be thought of as extending out of the sheet of paper containing FIG. 4 and defining therebetween angle α about a common line of intersection L along linear base segment 14.

Advantageously supporting bracket 10 is made of between 11.5 and 12.5 gauge high-density high tensile class II or III galvanized wire. Depending on the size of the object to be supported within space 24, in one preferred embodiment base 14, first leg 16 and second leg 18 may be between 55 and 75 millimeters in length. To allow for construction of support bracket 10 by radius bending of linear stock of high density wire, in one preferred embodiment the elbows 28 between base segment 14 and the legs are bends having 10 millimeter radii and the formed loops are bends having 6.625 millimeter radii. These dimensions are not intended to be limiting but rather illustrative of one preferred embodiment which applicant has determined may be resiliently clipped onto a heavy gauge linear support wire to support plants and irrigation pipes therethrough, for example irrigation pipes of ¾ inch–1 inch PVC piping. It has been found that angle α is, as illustrated, advantageously 20°, although tolerances of plus or minus 2–4° may also be employed. Gaps 30 are left when forming first and second formed loops 20 and 22 so that the formed loops may be hooked over supporting wire 12 upon installation of supporting bracket 10 onto support wire 1.2 as seen in FIGS. 6–10.

Figure 6:
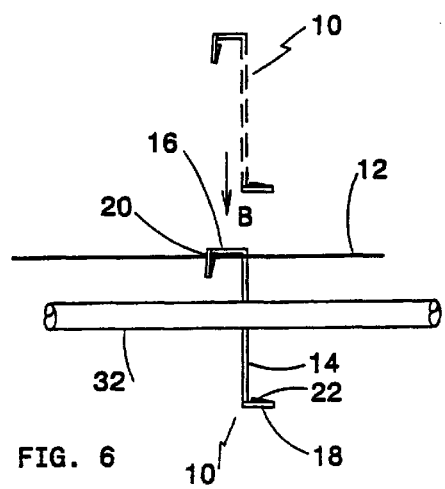
FIG. 6 is, in top plan view, a supporting bracket of the present invention being installed onto a support suspend an object therefrom.

FIGS. 6–10 illustrate how mounting bracket 10 is releasably clipped onto support wire 12, in particular, the resilient clipping of second formed loop 22 onto support wire 12 so as to support irrigation line 32 suspended beneath support wire 12. As seen in FIG. 6, supporting bracket 10 is initially translated in direction B from its initial position shown in dotted outline so as to hook first formed loop 20 over support wire 12 thereby extending base segment 14 underneath an elongate object be supported such as irrigation pipe 32. In that position, irrigation pipe 32 is cradled within supporting space 24 between first and second legs 16 and 18 respectively. With irrigation line 32 so cradled, supporting bracket 10 may be rotated from its position shown in dotted outline in FIG. 7, in direction C, so as to bring second formed loop 22 into proximity to support wire 12. In so doing, irrigation line 32 is brought into adjacent parallel relationship with support wire 12 and second formed loop 22 may then be hooked over support wire 12 by passing support wire 12 through corresponding gap 30 in loop 22. The radius dimension of first formed loop 20 as described above, in combination with the perpendicular relation between first formed loop 20 and second formed loop 22 results in supporting bracket 10 having to be slightly resiliently deformed in order to hook second formed loop 22 over support wire 12 as supporting bracket 10 is rotated in direction C. This resilient deformation results in the first and second formed loops being resiliently biased into frictional engagement with support wire 12, keeping in mind that, although support wire 12 is also typically of high density heavy gauge wire, support wire 12 is relatively rigidly tensioned so as to extend generally linearly between supporting posts. Being heavily tensioned, support wire 12 does not appreciably deform when support bracket 10 is mounted thereon.

Figure 7:
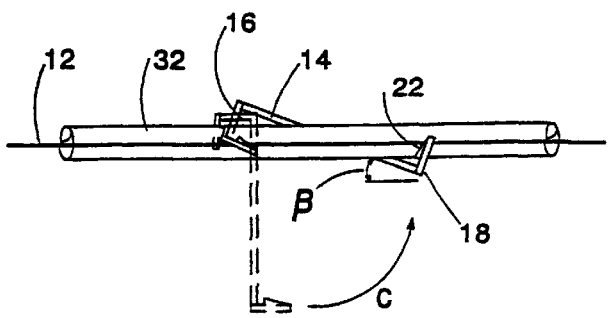
FIG. 7 is, in top plan view, the completed installation of the supporting bracket of FIG. 6 onto the support wire.
Figure 8:
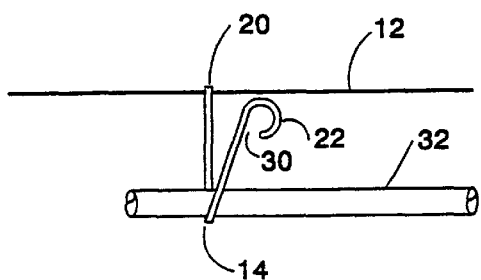
FIG. 8 is, in front elevation view, the installation of the support bracket of FIG. 6.
Figure 9:
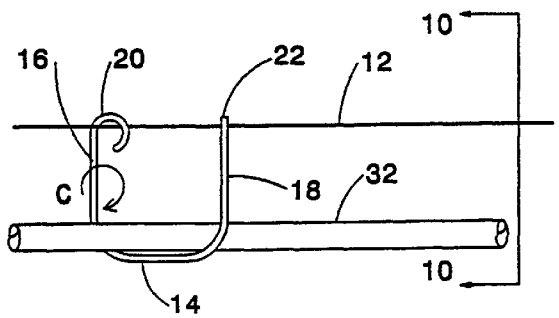
FIG. 9 is, in front elevation view, the completed installation of the supporting bracket of FIG. 7.
Figure 10:
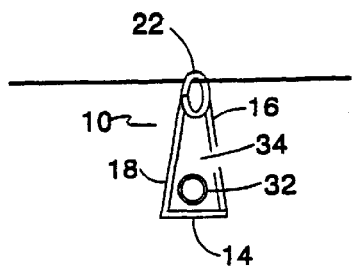
FIG. 10 is a section view along line 10—10 in FIG. 9.

When supporting bracket 10 is oriented so as to align the eyelets formed by first formed loop 20 and second formed loop 22 co-linearly with support wire 12, the divergence (at angle α) between first leg 16 and second leg 18 causes base segment 14 to be skewed by angle β relative to support wire 12, as better seen in FIGS. 7 and 10. As seen in FIG. 10, skewing base segment 14 forms irrigation line supporting space 34 between first leg 16, second leg 18, and base segment 14. This allows support bracket 10 to cradle irrigation line 32 parallel to support wire 12.

Figure 11:
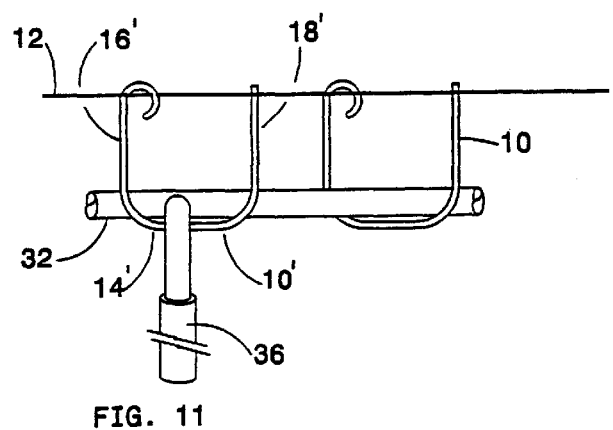
FIG. 11 a front elevation view of a sprinkler suspended from a support wire by the supporting bracket of the present invention.

With irrigation line 32 cradled within irrigation line supporting space 34 so as to rest on base segment 14 suspended below support wire 12, sprinkler heads 36 or the like as seen in FIG. 11 may be mounted to irrigation line 32.

Sprinkler head 36 may then be draped over base segment 14' so as to be cantilevered outwardly. With line 32 supported by bracket 10, a second bracket 10' is placed over the upper surface of line 32 by resting first and second legs 16' and 18' over the upper surface of irrigation line 32.

Thus it will be appreciated that the supporting bracket 10 of the present invention provides a simple economical means of supporting saplings and other plants against supporting wires and also a means for supporting irrigation pipes up off the ground and out of harms way. Supporting bracket 10 may be readily installed onto supporting wire 12 in a cost efficient and time efficient manner which is important in an orchard because of the many of such supporting brackets which are required. The supporting bracket 10 of the present invention advantageously allows for resiliently biased spring clip mounting of the supporting bracket onto the supporting wire 12 so that the supporting bracket 10 frictionally engages the supporting wire and is thus not easily dislodged longitudinally along the supporting wire. As described above, the spring clip mounting is accomplished by the approximately 90° offset between the formed loops at the distal ends of the supporting bracket, the size of one of the loops, and the angular offset of the first and second legs relative to each other about the axis of the base segment 14.

When manufactured as described above, the supporting bracket of the present invention provides for relatively easy and rapid mounting of the brackets onto the supporting wire, and conversely the easy and rapid removal of the brackets from the supporting wire without the requirement for tools. As compared to plastic clips in the prior art, the supporting bracket of the present invention does not exhibit similar deterioration due to exposure to the environment. The frictional engagement of the supporting bracket to the support wire makes the supporting bracket of the present invention well adapted for use on steep hillsides and windy locations where otherwise prior art clips may slip longitudinally along the support wire.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A support bracket for mounting on a support wire comprising:

a generally U-shaped resilient member defined by a base segment, a first leg extending from a first end of said base segment to a distal end of said first leg, and a second leg extending from a second end of said base segment, opposite said first end of said base segment, to a distal end of said second leg, a first loop formed at said distal end of said first leg, a second loop formed at said distal end of said second leg, said first loop, said first leg, and at least a portion of said base segment lying generally in a first plane, said second loop and said second leg lying generally in a second plane, said second leg and at least a portion of said base segment lying generally in a third plane, said first and third planes generally orthogonal to said second plane, said first and third planes intersecting along a line of intersection generally coextensive with at least a portion of said base segment, said first and third planes at an acute angle so as to define an acute angle of divergence therebetween, said second loop formed so as to lie outside of an area between said first and third planes swept out by said acute angle of divergence, said first loop having a first gap therethrough in proximity to said first leg for passing a support wire into said first loop, said second loop having a second gap therethrough in proximity to said second leg for passing said support wire into said second loop, whereby said first loop may be hooked over said support wire, so that said support wire is in said first loop and said U-shaped member depends from said support wire, and whereby said U-shaped member may thence be rotated in a first direction of rotation into a support wire first engaging position wherein said support wire is in contact with opposite interior sides of said first loop, and whereby said U-shaped member may thence be further rotated in said first direction of rotation from said support wire first engaging position into a support wire second engaging position by resilient bending of said U-shaped member wherein said second loop is hooked over said support wire and said support wire resiliently urged against an interior side of said second loop.

2. The support bracket of claim 1 wherein said first and second legs are generally parallel and generally linear.

3. The support bracket of claim 1 wherein said base segment is generally linear.

4. The support bracket of claim 1 wherein said acute angle of diversion is approximately 20 degrees.

5. The support bracket of claim 1 wherein said first and second loops are generally circular.

6. The support bracket of claim 1 wherein said U-shaped member is made of heavy gauge wire.

7. The support bracket of claim 1 wherein said first loop is sized so that, in said support wire first engaging position, said U-shaped member must be resiliently bent so as to further rotate said U-shaped member in said first direction of rotation into said support wire second engaging position.

8. The support bracket of claim 1 wherein said first loop is sized and said acute angle of diversion is sufficiently small so that, in said support wire first engaging position, said U-shaped member must be resiliently bent so as to further rotate said U-shaped member in said first direction of rotation into said support wire second engaging position.

* * * * *